Sept. 28, 1971  P. J. SCHOOTS  3,608,298
PEARLESCENT YARN
Filed March 25, 1969
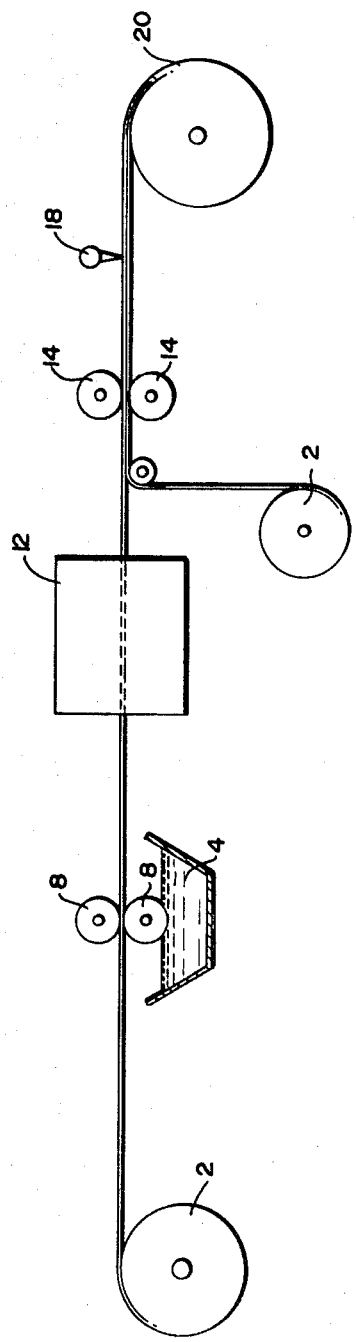
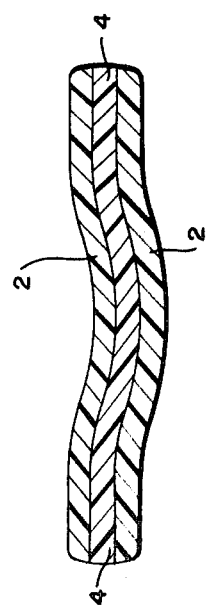
INVENTOR
PETER J. SCHOOTS
BY *Plumley, Tyner and Sandt*
ATTORNEYS

3,608,298
PEARLESCENT YARN

Peter J. Schoots, Nieuwendam, Netherlands, assignor to Lurex N.V., Amsterdam, Netherlands
Filed Mar. 25, 1969, Ser. No. 810,173
Int. Cl. D02g 3/06
U.S. Cl. 57—140R
8 Claims

ABSTRACT OF THE DISCLOSURE

Colored pearlescent yarns are obtained by laminating polyester films using an adhesive containing a pearlescent material and a suitable coloring pigment. The resulting yarns provide non-toxic pearlescent materials which may be based on toxic lead salts and which materials have a high degree of luster.

DISCLOSURE

This invention relates to pearlescent materials, more particularly to pearlescent materials, such as yarns adapted for use in the textile industry. Even more particularly, this invention provides a pearlescent high luster yarn having maximum suppleness and improved color fastness which color and luster are resistant to light and wet processing.

Pearlescent materials are those having a pearl-like luster. The luster is achieved due to layers of crystals which reflect part of an incident light beam and transmit part of that beam to lower crystalline layers. The pearlescent materials can be natural, such as guanine crystals obtained from fish scales, particularly from European minnow or herring, or the materials can be synthetic such as those crystals based upon lead and bismuth salts. The degree of luster is very important in pearlescent materials since it is that characteristic which makes the material pearl-like. The luster which should be provided is a high-luster material, but the color should be soft, i.e. relatively faint shades. Pearlescent materials have generally been produced in the past by either coating a pearlescent crystalline material onto a substrate or by incorporating the pearlescent material into a plastic composition and grinding the composition to provide pearlescent molding powders. Achieving high degree of luster has been a source of difficulty with such materials. Luster is dependent upon the type of pigment or salt used, the type of dispersant or carrier used, the refractive indices of these materials, the crystal size, shape, thickness, and smoothness, as well as the orientation of the crystals and the crystalline layers. When pearlescent materials are used with adhesives or plastics, the crystal characteristics are inevitably modified producing more variables.

The use of natural materials such as the above-noted fish scales is generally considered unsatisfactory since it is uneconomical to produce the material, and the product is not always of a quality suitable for commercial use. As noted above, the crystals must be fairly uniform in size, must be smooth, and must be easily aligned in the coating operation. The natural products do not yield smooth crystals or regular crystals, and accordingly, their use is not satisfactory in terms of the degree of luster produced.

The best synthetic pearlescent compositions arre based on lead salts such as lead carbonates which form hexagonal crystalline structures. These materials, however, have limited use due to the toxic nature of the lead salts. Bismuth salts are not as satisfactory in terms of the luster of the product; however, they have the advantage of being non-toxic. Accordingly, in pearlescent materials likely to be used near the body, the bismuth materials have generally been used. The results are often unsatisfactory in terms of luster since the crystalline structure of the bismuth salts is not as adaptable for coatings and blending as are the lead salts. Even the lead salts do not give a high luster material when molded with plastics or blended with adhesives by previously used techniques.

The noted disadvantage of prior pearlescent synthetic materials, i.e., the fact that the pearlescent compositions are found to exhibit a dull rather than a bright luster, is generally due to the particle size which has been used and to the carriers which have been employed. Additionally, the ability of the coating compositions to adhere is substantially reduced since the two problems of high luster and high adhesion have been somewhat incompatible. High luster requires a low degree of interference with the crystalline alignment, while adhesion requires substantial interference in terms of interspersing resin particles among the crystals. Accordingly, the luster and adhesive capacity of previously used pearlescent coating compositions has presented substantial problems.

This particular laminated structure with the pearlescent material included in the adhesive layer covered by the highly polished reflective film layers surprisingly produces a soft, lustrous appearance with undertones of glitter and sparkle never before achieved in coated pearlescent compositions. These structures are especially suited for yarns to be used in fabrics for high style and fashion.

One area wherein the toxic nature of lead materials and the low luster achieved with lead and bismuth materials presents a significant problem is in the textile industry. The use of woven fabrics which are to be commercially attractive requires pearlescent materials adapted to produce muted colors which have a high luster. Additionally, pearlescent textiles have generally been found to lose their initial luster after processing such as dry cleaning or laundering. In theory, this happens since the resin carrier or adhesive used and the pearlescent pigments are generally susceptible to attack and removal by dry cleaning solvents and alkali soaps and detergents.

Accordingly, it is a primary object of the present invention to provide a pearlescent composition which is adapted to form high luster, non-toxic textiles.

Another object is to provide a pearlescent yarn which is formed of clear films secured by a pearlescent adhesive wherein the adhesive is highly resistant to wet processing.

Another object of the invention is to provide a synthetic pearlescent material adapted for use in yarns wherein the resulting textiles are non-toxic.

Another object is to provide a yarn of synthetic materials having muted colors but also having a high degree of luster wherein the yarns have good tensile strength and yield forces.

Another object is to provide a pearlescent yarn which exhibits a glittering effect due to the reflectivity of clear plastic films and a pearlescent effect due to a pearlescent adhesive between plastic films.

Another object is to provide textiles such as knitted and woven fabrics, handknitted knitting yarns, and decorative twist yarns which are the pearlescent character.

These objects and others will become apparent by reference to the herein described figures and illustrative examples showing the structure, materials, and process which form preferred embodiments of this invention. In the figures, FIG. 1 is a schematic view of a process for producing the yarn of this invention;

FIG. 2 is a view of the yarn produced by the process of FIG. 1; and

FIG. 3 is a sectional view of the yarn of FIG. 2.

Referring to FIG. 1, the process of the present invention is seen to comprise providing a first web 2 of clear plastic, passing that web through coating rollers 8 adapted to apply adhesive 4 thereto, passing the coated web through a drying oven 12, and then through heated pressure rolls 14 wherein a second clear plastic layer 2 is laminated thereto, and passing the laminate through a slitting device 18 to a wind-up roller 20.

Referring to FIG. 2, the yarn is seen to comprise two outer layers 2 and an inner coating 4 which corresponds to the pigmented adhesive material according to the present invention. The outer layers 2 are clear and have a refractive index adapted to render the pearlescent or pigmented adhesive composition clearly visible. As seen in FIG. 3, the coating 4 may be exposed over a small area of the fiber surface. This exposure is at most on the order of 0.2 mil where the total peripheral surface of the yarn cross section may be from slightly over 14 mils to as much as 500 mils. The particular adhesive used herein resists attack by solvents, so the exposure is not detrimental in terms of the permanence of the fiber. Also, the small area of exposure reduces the danger of toxicity of lead salts to a minimal level.

In accordance with the present invention, a process has been developed for producing synthetic yarns by laminating clear plastic films using a laminating adhesive comprising a pearlescent material and a pigment material carried by a compatible adhesive resin, particularly an acrylonitrile rubber. The laminated films are then slit and packaged.

Referring more specifically to the process of the present invention, the synthetic films utilized are preferably polyester materials which are clear, that is transparent. The use of clear outer layers allows the maximum utilization of the pearlescent effects of the inner adhesive material and enhances those effects by giving a glittering appearance which results in a high luster product. Additionally, the laminate enables the use of the lead carbonates and other lead salts as the pearlescent material without encountering the toxic nature of the salts. Suitable plastic films are oriented polyesters, for example, polyethylene terephthalate, or other films both oriented and unoriented. It is clear that any other suitable material may be utilized so long as it is transparent and is adapted for use in the lamination process hereinafter disclosed. The lamination process involves supplying a film of the clear plastic material and coating an adhesive material containing the pearlescent material thereon. This coated film is passed through an oven and dried to remove solvent, whereupon a second film of clear plastic material of like or unlike material is laminated thereto by passing both through heated rollers maintained at a proper laminating pressure. After the lamination process, the web is slit by means of knives or other suitable techniques and the resulting product is wound in single strands or collected in tow form for packaging. One problem in the processing of the films is to maintain proper tension at the point of lamination in order to avoid bridging in the fibers produced. Bridging relates to the joining of the two materials which may occur when improper tension is provided or when one layer contracts more than the other, causing the other to buckle and bridge. Additionally, when using certain polyesters, e.g. Melinex S which is a commercially available clear polyester material, the temperature at lamination should not exceed 200° C. since at this temperature the shrinkage characteristics of the polyester film produce undesirable characteristics in the filaments. Uncontrollable crimp may be introduced in the yarns due to wrinkles which form when the film is subjected to excessive pressure or temperature at lamination.

While the films used can vary considerable in size, a suitable width is a 40-inch film of approximately 25–100 gauge. No primer is required on the film when the adhesive composition of the present invention is utilized. It may be desirable in some cases with other films to utilize a primer; however, in such instances suitable adhesive primers are well-known and, of course, depend on the type film and adhesive used. The adhesive is applied with a solvent carrier so it is necessary to remove the solvent. This is preferably conducted in an air-oven wherein hot air is applied to the surface of the coated film. The passage through the air oven is part of a continuous process, and the material resides in the oven on the order of 20 seconds. This dwell time varies with the film speed through the process. A suitable rate of travel of film during the processing steps shown in FIG. 1 is from 100 to 175 feet per minute.

After initial drying, lamination can occur with rolls heated at about 160–180° C., but the exact temperature depending on adhesive used, and maintained at about 0.1 lb. pressure per inch of film width. As shown in FIG. 1, a slitter is provided after the point of lamination. Any number of knives can be used on the slitter, but it is preferred to cut the film in widths of 70 mils to as much as ¼".

The adhesive utilized in the present invention forms an integral part of the inventive process and concept since the particular adhesive utilized enables one to compatibly blend lead carbonate or other pearlescent salts while producing a fiber which is resistant to wet cleaning processes. As noted above, one of the primary disadvantages of prior processes involving pearlescent coating compositions is the fact that the adhesive carrier either is not resistant to solvents and soaps, thus rendering the textiles of limited commercial use, or is of such a nature as to be incompatible with the pearlescent material, thus reducing the luster of the pearlescent materials.

The adhesive according to the present invention solves the problems of luster, compatibility, and permanence. It preferably comprises a medium-high acrylonitrile copolymer in combination with a polyvinyl-chloride-polyvinyl-acetate copolymer which has been modified with hydroxyl groups. Additionally, in order to improve the bonding characteristics of the composition, a small amount, for example 1.5 wt. percent, of an epoxy composition such as ERL–2774, a commercially available liquid aromatic epoxide by Union Carbide Corp. may be utilized. It is found that this composition has a long pot life and is adapted to produce high adhesion and high resistant coating compositions without interfering with the luster of the pearlescent materials. The preferred acrylonitrile copolymer is formed by conventional techniques such as polymerizing acrylonitrile and butadiene. One such polymer is Hycar 1042 supplied by B. F. Goodrich Chemical Company which is an acrylonitrile copolymer having a specific gravity of 0.98 and an average Mooney viscosity of 80. Alternatively, Hycar 1022, produced by B. F. Goodrich, may be used; this is an identical material having an average Mooney viscosity of 50. The higher viscosity material is preferred.

Additionally, other suitable adhesive materials which yield generally less satisfactory results are unsaturated polyester materials, epoxy materials, polyurethane adhesives, and polyvinyl adhesives.

The polyvinyl-chloride-polyvinyl-acetate copolymer modified with hydroxyl groups is a commercially available resin known as VAGH produced by Union Carbide. An alternative is a polyvinyl-chloride-polyvinyl-acetate copolymer known as VYHH which is also produced by Union Carbide. These copolymers may be used in conjunction with either of the acrylonitrile copolymers, Hycar 1042 or 1022. However, it has been found that VAGH is preferred since using the VMCH produces an adhesive having a reduced potlife and one which tends to react with lead carbonate pigments. The lead salt tends to gel the adhesive composition. Accordingly, when a potlife of only 4 to 8 hours is intended to be used, this resin may be used. Additionally, when a pigment material other than a lead salt is intended to be utilized, the VMCH may be used.

In addition to the above-noted combination of synthetic polymers, the adhesive composition is adapted to contain a pearlescent paste, preferably formed from a lead carbonate salt having hexagonal-shaped crystals known as Stella produced by Chemische Industrie Stella, N.V. It is clear that other pearlescent pigments such as bismuth pigments or natural material may be utilized; however, the lead carbonate is preferred. These materials give the luster which is characteristic of pearlescent materials and, in conjunction with clear polyester, forms a textile having a high degree of luster.

Another ingredient which is necessary in order to color the fibers and produce the muted background colors is a pigmenting material. The pigment or dyestuff which is preferred is a material having a particle size not exceeding 0.1 to 0.5 micron/particle. The only limitation on the pigmenting material is that the particle size be within the described range. This is necessary in order to yield a transparent material which will not interfere with the pearlescent luster and in order to improve laminar adhesion wherein the particles should not interfere with the adhesive particles. Particularly suitable pigments having the desired particle size are those supplied by the Ciba Company known as Microlith K and Microlith P pigments. Microlith K type pigments have the desired small particle size and are transparent to translucent coloring materials which achieve a uniform and level coating, deep shades, and substantially no bronziness. They are easily dispersible in organic solvents, lacquers such as vinyl resins, and printing ink vehicles. Alternatively, they are equally well dispersible in organic polymers per se. The difference in the Microlith K and Microlith P products is in the resinous carrier. Other dyestuffs which may be used are Orasol, also produced by Ciba; however, these are soluble in organic solvents and generally produce less permanent dyeing materials.

The entire composition is blended in a solvent or diluent for the adhesive such as methyl ethyl ketone, and/or toluene and other organic solvents.

A typical composition and process will be described in the specific example hereinafter described.

EXAMPLE

Pearlescent yarns were produced by coating a 25 gauge, 40-inch width clear polyethylene terephthalate film with a solution comprising 39.8% methyl ethyl ketone, 18.3% toluene, 6.5% VAGH, 1.14% ERL–2774, 34.4% Hycar 1042. This composition has an average Ford cup viscosity of 30 seconds at 20° C. 100 parts of this solution were blended with 20 parts Stella pearlescent paste and 5 parts of Microlith K pigment and poured into a coating composition feed tray. The composition was applied to one film by rotagravure printing. The coated film was passed at an approximate speed of 125 feet/minute through an air oven containing heated air at approximately 100° C. The film was then passed through rollers maintained at 170° C. and a second like film of polyethylene terephthalate was brought into contact with the coated surface of the initial film. After passing through the laminating rollers which were maintained at a nip pressure of about 0.1 lb./in. film width, the films were passed into contact with a rotating cutter having a series of knives adapted to produce filaments from .007 to 0.25 inch in width.

The samples were run wherein the initial run produced 68 denier (1/69 inch width) unsupported yarn having a breakage strength of 80–90 g., an extensibility of 90–100%, and a yield force, that is the tension wherein overstretching damages the yarn, of 45 g. The light fastness was 6–7 or better as measured by the British Standards Fastness Test which method is described in Standard Methods for the Determination of Colour Fastness of Textiles (second edition), published by Society of Dyers and Colourists, 19 Picadilly, Bradford, Yorks.

The subsequent sample produced a composite supported yarn of 101 denier with 2/15 denier natural nylon monofilaments as a supporting medium. The supported yarns had a breaking strength of 220–230 g., an extensibility of 5%, and a yield force which was not determined in view of the support provided by the nylon monofilaments. The light fastness was 6+ as measured by the British Standards Fastness Test, which method is described in Standard Methods for the Determination of Colour Fastness of Textiles (second edition). Published by Society of Dyers and Colourists, 19 Picadilly, Bradford, Yorks.

By subjecting the yarns of the two runs to chemical reactants which would normally be encountered during cleaning processes, superior results were observed. The yarns were scoured at 70–80° C. for one hour in a solution having a pH of 9. Excellent color fastness and adhesive fastness resulted. The materials were hand- and machine-washed as are wools and rayons without detrimental effects. They were ironed as are acetates. The materials are not affected in color and adhesive fastness by solvent treatments using conventional dry-cleaning solvents such as perchloroethylene and white spirit.

The yarns of the present invention may be packaged on devices such as non-returnable cardboard tubes or cones, which packages contain approximately 7 ounces (200 g.) of yarn, or they may be packaged on a plastic non-returnable spool which contains approximately 5.5 ounces (150 g.) of yarn. Clearly, the package is not intended to limit the invention; however, these packages are preferred for commercial distribution. The yarns may be supported or unsupported and the support can be added by usual techniques. The terms "supported" and "unsupported" are used since it is possible to include yarns such as nylon mono-filaments in order to increase the strength of the ultimate yarn. It should be recognized that the supported yarns may be less desirable in that they tend to be more expensive.

A considerable range of shades may be achieved (brown, black, yellow, blue, red, green, violet, and orange) by blending the pearlescent pigments with mircolith pigments. It is possible to attain such shades as sable, almond, citron, lilac, peach, beige, sand, pink, grey, and rose by proper blending with pigments. The only limitation on blending is to above-noted particle size which must not interfere with proper crystalline alignment of the pearlescent materials or with the adhesive materials. There should not be any materials present which interfere with such adhesive and alignment or the desired luster will be lost.

A series of further examples wherein different pigmenting compositions were utilized produced yarns having an average breakage strength of 90 g., an average yield strength of 49 g., an average elongation of 111%, and an average yield of 135,000 meters/kilogram of pearlescent composition in 1/69" width yarn. All had a high luster and were highly resistant to fading and solvent treatments.

Having described the invention in terms of non-limiting examples, what is desired to be protected by Letters Patent is defined in the appended claims.

What is claimed is:

1. A synthetic yarn comprising two clear plastic outer layers and an inner layer of an adhesive comprising an acrylonitrile material which contains a pearlescent lead salt pigment.

2. The yarn of claim 1 wherein the adhesive is an acrylonitrile-butadiene copolymer.

3. The yarn of claim 1 wherein the lead salt is lead carbonate.

4. The yarn of claim 1 wherein the adhesive comprises (1) a major amount of acrylonitrile-butadiene copolymer in combination with a minor amount of (2) a hydroxyl containing copolymer of polyvinyl-chloride and polyvinyl-acetate and a minor amount of (3) an aromatic epoxide; which adhesive is blended with a lead carbonate pearlescent pigment and a non-pearlescent pigment with particle size less than 0.5 micron and wherein the plastic layers are polyethylene terephthalate.

5. The yarn of claim 1 wherein the plastic layers are polyethylene terephthalate.

6. Yarn of claim 1 wherein the adhesive further contains a non-pearlescent pigment.

7. The yarn of claim 6 wherein the pigment particle size is below about 0.5 micron.

8. A fabric comprising the yarn of claim 1.

References Cited

UNITED STATES PATENTS

| | | | |
|---|---|---|---|
| 3,361,616 | 1/1968 | Scharf | 161—175 |
| 3,147,582 | 9/1964 | Scharf | 57—154X |
| 1,819,535 | 8/1931 | Assael | 161—5 |
| 2,363,570 | 11/1944 | Caprio | 106—148 |
| 2,772,994 | 12/1956 | Lacy | 161—175 |
| 3,361,616 | 1/1968 | Scharf | 161—175 |

FOREIGN PATENTS

| | | | |
|---|---|---|---|
| 548,834 | 10/1942 | Great Britain | 161—5 |

ROBERT F. BURNETT, Primary Examiner

R. O. LINKER, JR., Assistant Examiner

U.S. Cl. X.R.

57—155; 156—67; 161—174, 175, 231